United States Patent
Danielsen

(10) Patent No.: US 12,037,984 B2
(45) Date of Patent: Jul. 16, 2024

(54) SYSTEM AND METHOD FOR CONTROLLING BLADE PITCH OF WIND TURBINE ROTOR BLADES TO REDUCE VIBRATIONS AND LIMIT LOADS IN A LOCKED CONDITION OF THE ROTOR HUB

(71) Applicant: General Electric Company, Schenectady, NY (US)

(72) Inventor: Darren John Danielsen, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 303 days.

(21) Appl. No.: 17/545,000

(22) Filed: Dec. 8, 2021

(65) Prior Publication Data
US 2023/0175488 A1 Jun. 8, 2023

(51) Int. Cl.
*F03D 7/02* (2006.01)

(52) U.S. Cl.
CPC ......... *F03D 7/0296* (2013.01); *F03D 7/0224* (2013.01); *F05B 2260/966* (2013.01); *F05B 2270/321* (2013.01); *F05B 2270/328* (2013.01); *F05B 2270/331* (2013.01); *F05B 2270/332* (2013.01); *F05B 2270/334* (2013.01); *F05B 2270/708* (2013.01)

(58) Field of Classification Search
CPC ................ F03D 7/0224; F03D 7/0296; F05B 2260/966; F05B 2270/321; F05B 2270/328; F05B 2270/331; F05B 2270/332; F05B 2270/334; F05B 2270/708
See application file for complete search history.

(56) References Cited

U.S. PATENT DOCUMENTS 9,366,230 B2 * 6/2016 Perley .................... F03D 7/042
10,598,151 B2 * 3/2020 Saxena .................. F03D 9/257
(Continued)

FOREIGN PATENT DOCUMENTS

| EP | 2 306 005 A2 | 4/2011 |
|---|---|---|
| EP | 2 483 555 A2 | 8/2012 |
| EP | 3 859 144 A1 | 8/2021 |

OTHER PUBLICATIONS

The EP Search Report for EP application No. 22208375.0, dated Apr. 28, 2023, 8 pages.

*Primary Examiner* — Tulsidas C Patel
*Assistant Examiner* — Thomas K Quigley
(74) *Attorney, Agent, or Firm* — Dority & Manning, P.A.

(57) ABSTRACT

A system and method are provided for reducing vibrations and loads in one or more rotor blades of a wind turbine when the rotor hub is locked against rotation, The method detects that the rotor blades are vibrating above a threshold limit, and determines one or more wind parameters for wind impacting the rotor blades. An initial orientation of the blades is also determined. Based on the wind parameters and initial blade orientation, a first angle of attack for the rotor blades is determined that will reduce the vibrations in the rotor blades. The method then determines if expected loads induced at one or more wind turbine components will exceed a threshold limit at the first angle of attack for the rotor blades. The first angle of attack is modified when the expected loads exceed the threshold limit to reduce the expected loads to below the threshold limit. A controller pitches the rotor blades to achieve the first angle of attack.

11 Claims, 6 Drawing Sheets

(56) References Cited

U.S. PATENT DOCUMENTS

| | | | |
|---|---|---|---|
| 2007/0057517 A1* | 3/2007 | McNerney | F03D 7/042 290/44 |
| 2011/0164975 A1* | 7/2011 | Vyas | F03D 1/0608 416/37 |
| 2014/0271181 A1* | 9/2014 | Perley | F03D 7/04 416/61 |
| 2020/0124024 A1* | 4/2020 | Gregg | F03D 7/042 |
| 2020/0173418 A1 | 6/2020 | Arroyo Beltri et al. | |

* cited by examiner

SYSTEM AND METHOD FOR CONTROLLING BLADE PITCH OF WIND TURBINE ROTOR BLADES TO REDUCE VIBRATIONS AND LIMIT LOADS IN A LOCKED CONDITION OF THE ROTOR HUB

FIELD

The present disclosure relates in general to wind turbine power generating systems, and more particularly to systems and methods for damping vibrations and loads in wind turbines, particularly when the rotor hub is locked, by controlling the blade pitch.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades, wherein the rotation generates a torque that is transmitted through a rotor shaft to a generator, either directly ("directly driven") or through the use of a gearbox. This way, the generator produces electricity which can be supplied to the electrical grid.

There is a trend to make wind turbine blades increasingly longer to capture more wind and convert the energy of the wind into electricity. This results in the blades being more flexible and more prone to aero-elastic instabilities, e.g., vibrations of the blades. Vibrating blades create risk of major potential damages in the entire wind turbine.

When the wind turbine is in operation, a wind turbine controller may operate directly or indirectly any auxiliary drive system such as a pitch system or a yaw system to reduce loads on the blades. This way, vibrations of the blades may be counteracted. However, the problem of aero-elastic instabilities can be serious as well in circumstances when the wind turbine is in stand-still conditions, either idling or locked. Such oscillations include in particular edgewise oscillations.

At least two types of vibrations may happen during stand-still conditions. The first one is vortex induced vibration (VIV) when an angle of attack is around 90 degrees and vortices shed at frequencies close to blade eigen frequencies. The second one is stall induced vibration (SIV) when the angle of attack is close to stall angles (e.g., 15 degrees-20 degrees or other ranges depending on the wind turbine design) and the flow interaction may lead to blade vibrations. The angle of attack may be understood as a geometrical angle between a flow direction of the wind and the chord of a rotor blade.

The vortex and stall induced vibrations are phenomena that, if not adequately designed or compensated for, can lead to blade failure or accelerate blade damage.

When the rotor is locked against rotation, for instance due to installation, commissioning, or maintenance tasks, the blades can experience aero-elastic instabilities, such as the VIV and SIV vibrations. Blades are susceptible to these vibrations when angles of attack are within certain ranges (e.g., 25-45 degrees for SIV and 70-110 degrees for SIV for a certain blade and wind turbine design). Because the rotor is locked, rotation of the rotor cannot be used to reduce or damp these vibrations.

In addition, excessive loads may be placed on the wind turbine components by changing the blade pitch of a locked rotor. For example, some pitch angles may be acceptable to damp the non-operational aero-elastic instabilities (e.g., SIV and VIV), but can result in unacceptable loads on certain wind turbine components.

A current solution to the cited problems includes the use of aerodynamic devices attached to the blades to reduce vortices and/or increase damping. However, this solution may increase costs and time for installation and removal.

Another current solution includes setting the pitch angle of the rotor blades to substantially 90 degrees (a "feathered" position) when the rotor is prevented from rotating by means of a locking pin. This particular pitch angle may reduce loads on the blades, at least with some wind conditions. However, the locking pin may suffer from higher loads when the pitch angle is set at the weathervane position and, even in this position, not all vibrations may be avoided, particularly if the wind direction changes over time.

The published US Patent Application 2020/0173418 proposes a method for reducing vibrations in the rotor blades of a wind turbine when the wind turbine is in a standstill or locked condition that entails using sensors to first measure one or more deformation parameters indicative of vibrations or oscillations (collectively referred to as vibrations herein) being induced in the blades. The method uses a dedicated controller in communication with the sensors to determine if vibrations exist based on the measured deformation parameters. The dedicated controller is also in communication with an auxiliary pitch drive system and generates an output signal to operate the auxiliary drive system to change blade pitch between 0 to 90 degrees in order to reduce the vibrations. The method and system of the '418 application, however, do not consider the loads that may be placed on the wind turbine components by changing the blade pitch of a locked rotor. Some pitch angles may be acceptable to damp the aero-elastic instabilities (e.g., SIV and VIV), but can result in unacceptable loads on certain wind turbine components.

The present disclosure provides examples of operational methods and system for wind turbines that at least partially resolve some of the aforementioned disadvantages.

BRIEF DESCRIPTION

Aspects and advantages of the invention will be set forth in part in the following description, or may be obvious from the description, or may be learned through practice of the invention.

The present disclosure encompasses a method for preventing or at least reducing vibrations and loads in one or more rotor blades on a rotor hub of a wind turbine when the wind turbine is in a standstill condition with the rotor hub locked against rotation and the turbine is unable to yaw. The method includes detecting that one or more of the rotor blades are vibrating above a threshold limit and determining one or more wind parameters for wind impacting the rotor blades. The method includes determining an initial blade orientation of the blades to an incoming wind direction. Based on the wind parameters and the initial blade orientation, the method includes determining a first angle of attack for the rotor blades that will reduce the vibrations in the rotor blades, preferably to zero vibrations. For the present disclosure, the "angle of attack" is a position of the blade relative to incoming wind that is calculated to achieve a desired blade orientation and is dependent on rotor position, pitch angle, rotor geometry (such as cone shape, shaft tilt, blade pre-bend, blade twist), etc.), wind direction, wind speed, wind-up flow angle, and wind veer.

The method also includes determining if expected loads induced at one or more wind turbine components will exceed a threshold limit at the first angle of attack for the rotor blades. The method modifies the first angle of attack when the expected loads exceed the threshold limit to reduce the expected loads to below the threshold limit. With a controller, the method includes pitching the rotor blades from their initial orientation to the first angle of attack using an auxiliary drive system in the wind turbine.

In a certain embodiment, the method may include determining that yaw control is unavailable for the locked rotor hub as a prerequisite to pitching the rotor blades to the first angle of attack. If yaw control is available, it is assumed that the yaw position of the nacelle (and thus the rotor hub) can be changed to reduce or eliminate the blade vibrations.

The wind parameters that are detected or measured for practice of the method may be any one or combination of wind direction, wind up-flow, wind speed, and wind veer.

In a particular embodiment, the first angle of attack may be computed in real time by the controller. In an alternate embodiment, the first angles of attack is predetermined (e.g., empirically or via modeling) for different wind parameters (including combinations of wind parameters) and stored in an electronic lookup table accessible by the controller.

In a "smart" or "adaptive" embodiment, the method may further include determining an initial angle of attack of the rotor blades that are vibrating and comparing the first angle of attack to the initial angle of attack. If the initial angle of attack and the adjusted angle of attack are equal within a defined range at the same wind parameters, a second (different) angle of attack is determined by the controller to reduce the vibrations and maintain the expected loads to below the threshold limit. The second angle of attack may be computed by the controller in real time or may be predetermined for the different wind parameters (including combinations of the wind parameters) and stored in the lookup table for selection by the controller. This embodiment may include updating the lookup table such that the selected second angle of attack replaces the first angle of attack in the table at the respective wind parameters for subsequent use by the controller. This embodiment may include determining and storing at least one additional second angle of attack in the lookup table for the wind parameters for use in subsequent performance of the method.

In an alternate method embodiment according to the invention, determination and modification of the first angle of attack based on the estimated loads need not be done sequentially but may be accomplished in a single step. Accordingly, a method is provided for reducing vibrations and loads in one or more rotor blades on a rotor hub of a wind turbine when the wind turbine is in a standstill condition with the rotor hub locked against rotation. The method includes detecting that one or more of the rotor blades are vibrating above a threshold limit and determining one or more wind parameters for wind impacting the rotor blades. Based on the wind parameters, a first angle of attack is determined for the rotor blades, wherein the first angle of attack is predetermined to reduce the vibrations on the rotor blades and, for the determined wind parameters, maintain expected loads induced at one or more wind turbine components below a threshold limit. A controller then pitches the rotor blades to the first angle of attack using an auxiliary drive system in the wind turbine.

The first angle of attack for different wind parameters may be predetermined and stored in a lookup table accessible by the controller.

This embodiment may include determining an initial angle of attack of the vibrating rotor blades and comparing the first angle of attack to the initial angle of attack. When the initial angle of attack and the adjusted angle of attack are equal within a defined range at the same wind parameters, the method may determine a second angle of attack for the vibrating rotor blades at the wind parameters to reduce the vibrations and maintain the expected loads below the threshold limit. The second angle of attack may be computed by the controller in real time or may be predetermined for the wind parameters and stored in the lookup table for selection by the controller.

The alternate embodiment may include updating the lookup table such that the selected second angle of attack becomes the first angle of attack at the determined wind parameters for subsequent performance of the method.

The present invention also encompasses a wind turbine having rotor blades on a rotatable rotor hub and one or more wind sensors located to detect wind parameters of wind impacting the rotor blades, as well as one or more vibration sensors located to detect parameters indicative of vibrations in the rotor blades. A pitch system is configured to change a pitch angle of the rotor blades. A controller is provided in operable communication with the pitch system. In a locked state of the rotor hub, the controller is configured to: detect that one or more of the rotor blades are vibrating above a threshold limit; determine one or more wind parameters for wind impacting the rotor blades; determine an initial blade orientation of the blades to an incoming wind direction; based on the wind parameters and initial blade orientation, determine a first angle of attack for the rotor blades that will reduce the vibrations in the rotor blades and maintain expected loads induced at one or more wind turbine components at the first angle of attack below a threshold limit; and pitch the rotor blades with the pitch system to the first angle of attack.

In an embodiment of the wind turbine, the controller may be further configured to: determine an initial angle of attack of the vibrating rotor blades; compare the first angle of attack to the initial angle of attack; and when the initial angle of attack and the adjusted angle of attack are equal within a defined range at the same wind parameters, determine a second angle of attack for the vibrating rotor blades to reduce the vibrations and maintain the expected loads below the threshold limit.

The wind turbine may also include or have access to an electronic lookup table accessible by the controller, wherein the first angle of attack and one or more of the second angle of attack are predetermined for the wind parameters, stored in the lookup table, and selectable by the controller. In this embodiment, the controller may be further configured to update the lookup table such that the selected second angle of attack becomes the first angle of attack at the determined wind parameters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
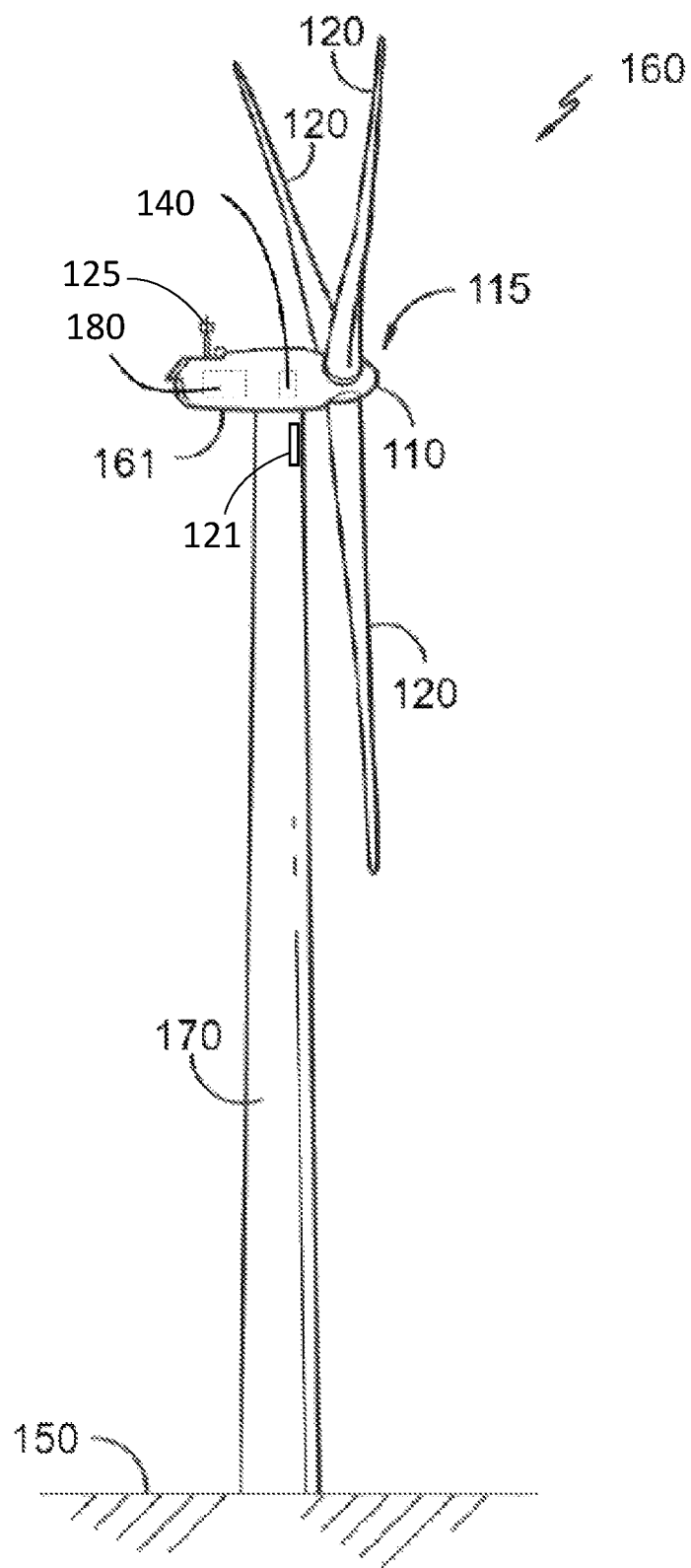
FIG. 1 illustrates a perspective view of a wind turbine according to one example.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "controller" refers not only to integrated circuits referred to in the art as being included in a computer, but also refers to a microcontroller, a microcomputer, a programmable logic controller (PLC), an application specific integrated circuit, and other programmable circuits. The controller is also configured to compute advanced control algorithms and communicate to a variety of Ethernet or serial-based protocols (Modbus, OPC, CAN, etc.). Additionally, a memory device(s) configured with the controller may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 402, configure the controller to perform the various functions as described herein.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated example, the rotor 115 includes three rotor blades 120. However, in an alternative embodiment, the rotor 115 may include more or less than three rotor blades 120. Each rotor blade 120 is spaced from the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 or forming part of the nacelle for producing electrical energy.

The wind turbine 160 includes a wind turbine controller 180 that may be centrally located within the nacelle 161 or external to the nacelle. However, in other examples, the wind turbine controller 180 may be located within any other component of the wind turbine 160 or at a location outside the wind turbine. Further, the controller 180 may be communicatively coupled to any number of components of the wind turbine 160 in order to control the operation of such components.

Figure 2:
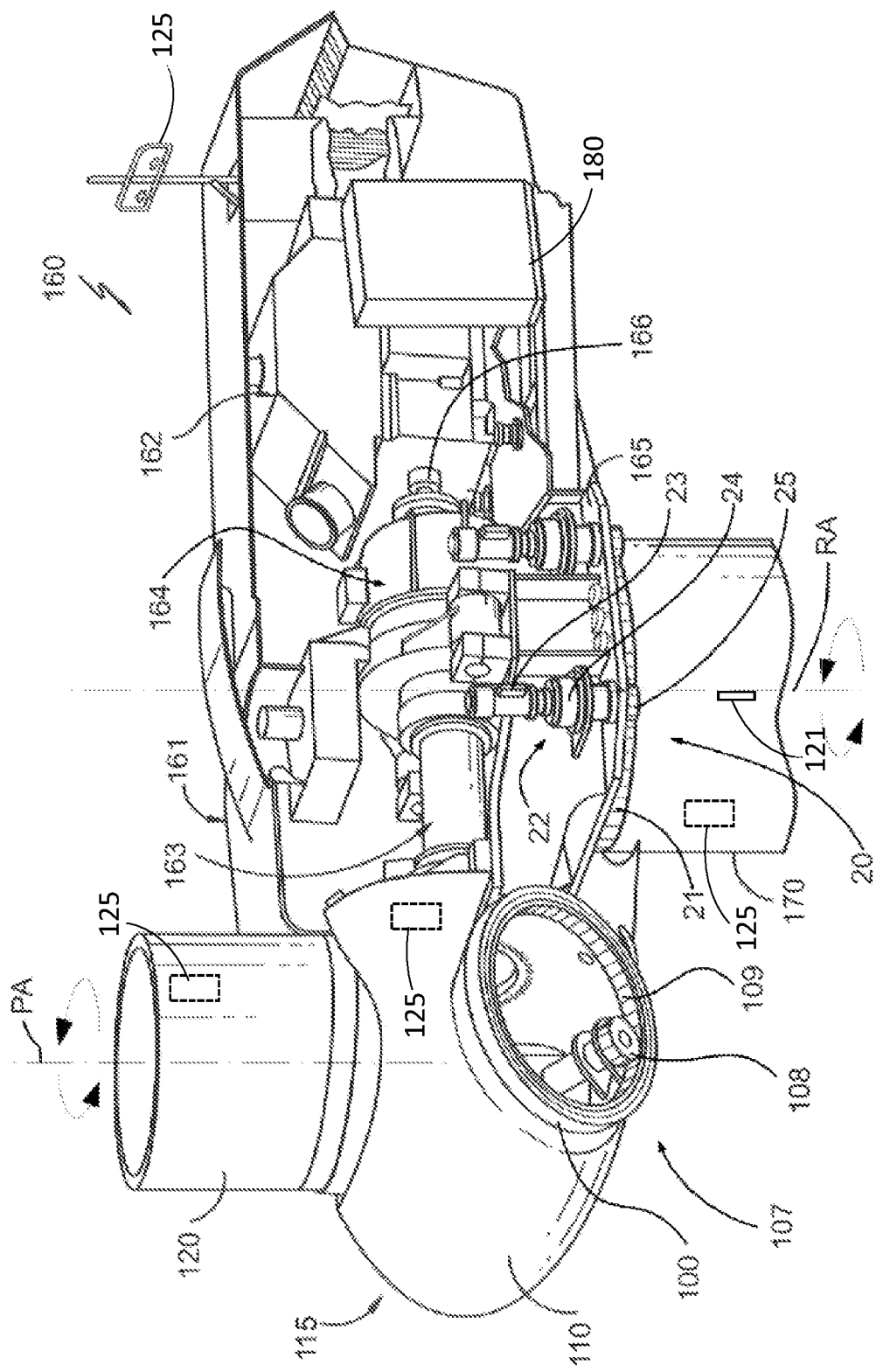
FIG. 2 illustrates a simplified, internal view of a nacelle of a wind turbine according to one example.

For example, the controller 180 may be communicatively coupled to one or more auxiliary drive systems, such as a pitch system 107 FIG. 2) for adjusting a blade pitch. Alternatively, the controller 180 drive system may comprise a yaw system 20 (FIG. 2) for rotating the nacelle 161 with the respect to the tower around a rotational axis.

The present disclosure relates to situations wherein the rotor 115 (and thus the rotor hub 110) is locked against rotation, for instance due to installation, commissioning, maintenance tasks, or any other reason. The present disclosure contemplates that the controller 180 remains communicatively coupled to at least the pitch system 107 in the locked state of the rotor 115.

However, the present disclosure also contemplates that the "controller" function may also be provided by a separate dedicated controller during the locked state of the rotor, as described in the published US Patent Application 2020/0173418 discussed above and incorporated herein in its entirety for all purposes. The dedicated controller may be configured to operate autonomously, i.e., independently from the wind turbine controller 180, at least in some operating conditions, and may be able, to perform tasks such as receiving and emitting signals and processing data when the wind turbine controller 180 is a standstill condition with the rotor 115 locked.

The wind turbine 160 of FIG. 1 may be placed in an offshore or onshore location.

The wind turbine controller (or "central control system") 180 may include one or more processor(s) and associated memory device(s) configured to perform a variety of computer-implemented functions (e.g., performing the methods, steps, calculations and the like and storing relevant data as disclosed herein). The wind turbine controller may perform various different functions, such as receiving, transmitting and/or executing wind turbine control signals and controlling the overall operation of the wind turbine. The wind turbine controller may be programmed to control the overall operation based on information received from sensors indicating e.g., loads, wind speed, wind direction, turbulence failure of a component, and others.

The wind turbine controller 180 may also include a communications module to facilitate communications between the controller 180 and the components of the wind turbine and their individual control systems (e.g., a controller for the pitch system 107, a controller for the yaw system 20, a converter control system, and other controls and components.

Further, the communications module may include a sensor interface (e.g., one or more analog-to-digital converters) to permit signals transmitted from one or more wind parameter sensors or load sensors to be converted into signals that can be understood and processed by the controller 180. It should be appreciated that the sensors may be communicatively coupled to the communications module using any suitable means as, for example, a wired connection or a wireless connection.

FIG. 2 illustrates a simplified, internal view of one example of the nacelle 161 of the wind turbine 160 of the FIG. 1. As shown, the generator 162 may be disposed within the nacelle 161 and coupled to the rotor 115 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a rotating axis or "yaw axis" RA as seen in FIG. 2. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

The blades 120 are coupled to the hub 110 with a pitch control system 107 that includes a pitch bearing 100 between the blade 120 and the hub 110. The pitch bearing 100 comprises an inner ring and an outer ring (shown in FIG. 2). The wind turbine blade 120 may be attached either at the inner bearing ring or at the outer bearing ring, whereas the hub 110 is connected at the other bearing ring. A blade 120 may perform a relative rotational movement with respect to the hub 110 when the pitch control system 107 is actuated. The rotational movement is performed around a pitch axis PA and thus can be measured in degrees. The inner bearing ring may therefore perform a rotational movement with respect to the outer bearing ring. The pitch control system 107 of FIG. 2 comprises a drivable pinion 108 that meshes with an annular gear 109 provided on the inner bearing ring to set the wind turbine blade 120 into rotation.

Even though the pitch axis is shown for only a single blade 120, it should be clear that each of the blades 120 has such a pitch axis. A single pitch system or a plurality of individual pitch systems may be used to rotate the respective blades 120 around their longitudinal axes.

In the standstill state of the wind turbine 160 with the rotor 115 locked against rotation by, for example by a locking pin, the wind turbine is not generating electrical power and is likely not receiving electrical power from a grid. In such instances, the wind turbine 160 further includes a dedicated power source 140 (FIG. 1), which may comprise a battery or a super-capacitor (not illustrated) that stores a predefined amount of energy to supply the controller 180 (or a dedicated controller) and the auxiliary drive system 20, 107 for a predefined period of time. In alternative examples, the dedicated power source 140 may comprise a fuel generator, such as a diesel generator.

As discussed in greater detail below, aspects of the present disclosure rely on detection of wind parameters acting on the blades 120, such as wind direction and speed. Referring to FIGS. 1 and 2, the wind turbine 10 may include one or more wind parameter sensors 125 for measuring various wind parameters upwind of the wind turbine 160. For example, as shown in FIG. 2, one sensor 125 may be located on the hub 110 so as to measure an actual wind parameter(s) upwind from the wind turbine 160. The actual wind parameter(s) may be any one or combination of the following: wind gust, wind speed, wind direction, wind acceleration, wind turbulence, wind shear, wind veer, wake, wind up-flow, or similar. Further, the one or more sensors 125 may include at least one LIDAR sensor for measuring upwind parameters. For example, the sensor 125 in the hub 110 may be a LIDAR sensor, which is a measurement radar configured to scan an annular region around the wind turbine 160 and measure wind speed based upon reflection and/or scattering of light transmitted by the LIDAR sensor from aerosol. The cone angle ($\theta$) and the range (R) of the LIDAR sensor may be suitably selected to provide a desired accuracy of measurement as well as an acceptable sensitivity.

In further embodiments as depicted in FIG. 2, the one or more LIDAR sensors may also be located on the wind turbine tower 170, on one or more of the wind turbine blades 120, on the nacelle 161, one a meteorological mast of the wind turbine, or at any other suitable location. In still further embodiments, the wind parameter sensor 125 48 may be located in any suitable location near the wind turbine 160. The sensors 125 may be configured to measure a wind parameter ahead of at least one specific portion, typically the most significant sections of the blades 120 in terms of contributions of those sections to aerodynamic torque on the blades 120. These sections may include, for example, sections close to the tip of the blade.

In alternative embodiments, the sensors 125 need not be LIDAR sensors and may be any other suitable sensors capable of measuring wind parameters upwind of the wind turbine 160. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein with respect to the sensors, the term "determine" and variations thereof indicates that the various sensors of the wind turbine may be configured to provide a direct measurement of the parameters being monitored or an indirect measurement of such parameters. Thus, the sensors 125 may, for example, be used to generate signals relating to the parameter being monitored, which can then be utilized by the controller 180 to determine the actual wind condition.

Figure 3:
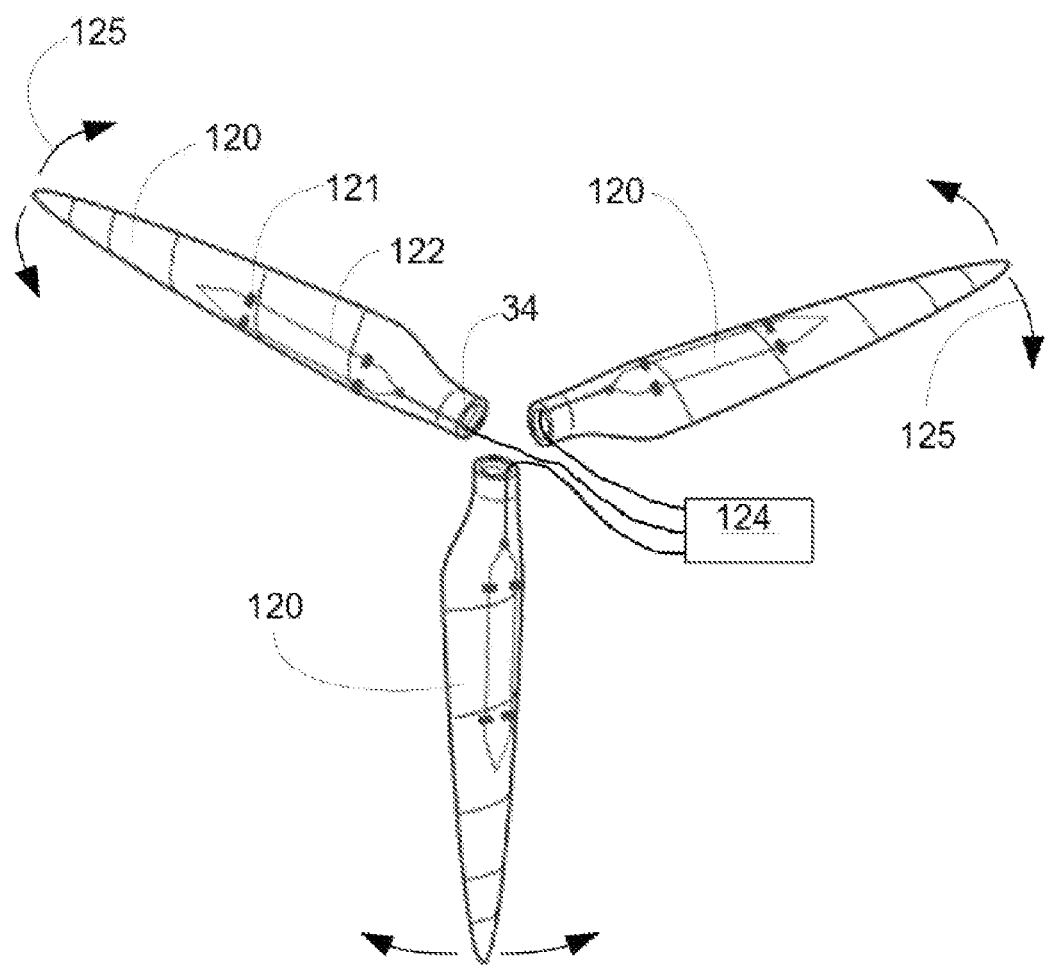
FIG. 3 illustrates blades of the wind turbine with strain sensors.

Other aspects of the present disclosure rely on the determination of loads acting on certain components of the wind turbine 160. Referring to FIGS. 1 and 2, load sensors 121 may be utilized for measuring a deformation of one or more of the relevant components, such as the blades 120, tower 170, bed plate, as so forth. Such sensors may be strain sensors that detect a deformation/strain parameter of the component. For example, FIG. 3 depicts an embodiment wherein strain sensors 121 are fiber optic strain gauges fixed at a structure of the blades 120 so as to measure strains at any portions of the blade, e.g., a blade root 34. Thus, loads on the blade may be calculated on the basis of the measured strains. The strain sensors 121 may be connected with each other through an optical path 122, e.g., optical fiber. The optical path 122 also allows the strain sensors 121 to be in communication with a sensor interrogation unit 124 or reading unit placed in the hub 110 or the nacelle 161. The sensor interrogation unit 124 is configured to feed the optical path 122 with emitted light pulses (not illustrated) and to receive light pulses from the strain sensors 121. The interrogation unit 124 is further configured to compare the emitted light pulses with received light pulses so as to determine deflections in blades 120. The number and location of strain sensors 121 in blades 120 (or other components) may vary depending on particular requirements.

The controller 180 may include or may be integral with the sensor interrogation unit 124. Alternatively, the sensor interrogation unit 124 may be separated from the controller 180 and in data communication with each other.

In some other examples, the strain sensors 121 may be provided with temperature sensors. Temperature data from temperature sensors may be taken into account by the unit 124 or even by the controller 180 because the temperature may affect operation and characteristics of strain sensors 121.

Alternatively, to the example of optical strain gauges, other types of sensors 121 capable of indicating a deformation of one or more of the blades 120 or other components may be used. Examples include accelerometers or displacement sensors in data communication with the controller 180.

In other embodiments, the loading conditions on various components of the wind turbine 160 may be indirectly determined. For example, the controller 180 (or other controller in communication with the controller 180) may receive operating data may consist of any or combination of the following: a pitch angle, a generator speed, a power output, a torque output, a temperature, a pressure, a tip speed ratio, an air density, or other similar operation condition. The controller then calculates an estimated load condition as a function of various combinations of the operating data. In one embodiment, for example, the controller may implement an estimator functionality with a control algorithm having a series of equations to determine the estimated load condition as a function of the pitch angle, the generator speed, the power output, and the air density. Further, the equations may be solved using the operating data and one or more aerodynamic performance maps. In one embodiment, the aerodynamic performance maps are dimensional or non-dimensional tables that describe rotor loading and performance (e.g., power, thrust, torque, or bending moment, or similar) under given conditions (e.g., density, wind speed, rotor speed, pitch angles, or similar). As such, the aerodynamic performance maps may include power coefficient, thrust coefficient, torque coefficient, and/or partial derivatives with respect to pitch angle, rotor speed, or tip speed ratio. Alternatively, the aerodynamic performance maps can be dimensional power, thrust, and/or torque values instead of coefficients.

Further, the control functionality may also include one or more electronic look-up tables (LUTs). In various embodiments, at least some of the LUTs may include: a wind turbine thrust, a blade loading, a tower loading, a shaft loading, a nacelle loading, a hub loading, or any other wind turbine loading condition for various combinations of wind parameters. As such, depending on the embodiment, the estimated load condition may be representative of wind parameters near the wind turbine or loading conditions of the wind turbine. As mentioned, the wind parameters may include a wind gust, a wind speed, a wind direction, a wind acceleration, a wind turbulence, a wind shear, a wind veer, a wake, or similar. Loading conditions may include a wind turbine thrust, a blade loading, a tower loading, a shaft loading, a nacelle loading, a hub loading, or similar.

Other aspects of the present disclosure rely on the determination of vibrations induced in one or more of the blades 120. The strain sensors 121 discussed above may be used in this regard. A vibration of a blade may be determined when the strain or deformation parameter satisfies a strain or deformation threshold, which may be determined by the controller 180.

Strains in the edgewise direction of a blade 120 may cause a counter deflection of the blade 120 in opposite direction owing to flexible properties of blade 120. That may produce an oscillating displacement of the blade 120 when the wind turbine 120 is in standstill conditions. Therefore, the strain threshold of the example above may be related to a predefined amplitude threshold of the oscillation. When the strain parameter satisfies a strain threshold, it may mean that the amplitude of the oscillation of one or more blades 120 may be excessive. Then, a vibration condition may be determined. In FIG. 3, arrows 125 designate exemplary directions followed by the oscillating displacement of blades 120.

According to some examples, determining a vibration of one or more blades may comprise processing an input signal which includes the strain parameter. The input signal may comprise a waveform of the strain parameter over time, which may be received from the sensor interrogation unit 124 or from the strain sensors 121.

An oscillating displacement or movement of a blade 120 over a predefined period of time may involve a frequency. Therefore, in order to process the input signal, some examples of the method may comprise filtering the input signal and analyzing frequencies of the input signal which satisfy a frequency threshold. This way, only frequencies in a predefined critical range may be analyzed. Alternatively, the input signal may be processed analyzing all the spectrum of frequencies of the input signal. Through both alternatives, the auxiliary drive system may counteract the vibration condition by changing the angle of attack of the blades 120, as described herein.

In one example, the method may further comprise determining whether one or more blades is in a resonance condition, which may be determined by the controller 180. The resonance condition may be determined when the frequency of the input signal satisfies a resonance threshold. The resonance threshold may involve frequencies higher than the frequency threshold. Alternatively, the resonance condition may be determined when the frequency of the input signal, and thus the energy of the vibration, increases for a defined time period.

Figure 4:
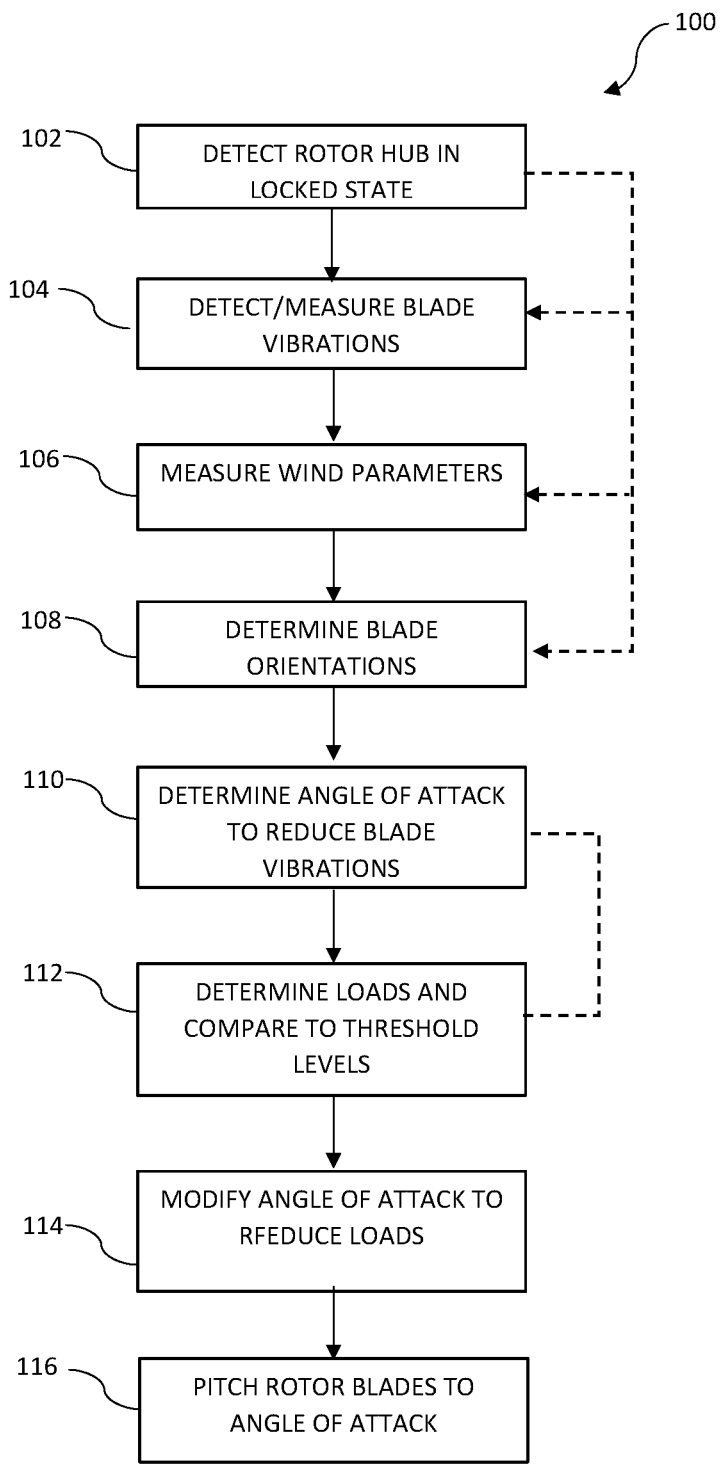
FIG. 4 shows a flowchart of a method for reducing vibrations and load in rotor blades of a wind turbine according to one example.

Referring to FIG. 4, an embodiment of a method 100 in accordance with aspects of the present invention is depicted in flowchart form. At step 102, the state of the rotor hub is detected by the controller 180. Specially, via any suitable sensor or input signal, it is determined whether or not the rotor hub is locked against rotation. The dashed lines in FIG. 4 are meant to convey that steps may be performed concurrently.

At step 104, blade vibrations are detected or measured, for example using the strain/deformation sensors 121 as discussed above or acceleration sensors.

At step 106, the wind parameters of interest are determined via the sensors 125 discussed above. These parameters may include, for example, any one or combination of wind direction, wind speed, wind veer, and wind up-flow. Wind veer is understood to mean wind direction variations with respect to vertical height. Wind up-flow is understood to mean an angle of the wind with respect to horizontal.

At step 108, and initial blade orientation of the rotor blades is determined based on a number of factors, such as the rotor position (e.g., determined by rotor position sensors), yaw position relative to wind direction, turbine geometry (e.g., shaft tilt, cone shape, blade pre-bend, blade twist, etc.) and pitch angle. It should be appreciated that, other than pitch angle, once the rotor is locked, the factors that are not dependent on a wind parameter do not change.

At step 110, an angle of attack (first) for the blades is determined that will reduce or eliminate blade vibrations, as well as a pitch command/position that will place the blades in the desired angle of attack orientation. The angle of attack is generally referred to as the angle between the chord line of the blade and the relative wind vector. It should be appreciated that the angle of attack may vary along the span of the blade due to design twist in blades.

For the present disclosure, the "angle of attack" is a position of the blade relative to incoming wind that is calculated to achieve the desired elimination or reduction of blade vibrations based on the initial blade orientation Once the desired angle of attack is computed based on the parameters identified above, a pitch command is generated by the controller to pitch the blade(s) to a pitch angle that most-closely achieves the angle of attack for the blade. The control system and methodology ensure that angles of attack along the entire span avoid the SIV/VIV angles of attack.

It should be understood that the angle of attack may vary for the individual blades based on their initial blade orientation and varying wind parameters at their different relative locked rotational position. Separate angles of attack may be determined by the controller for each individual blade and may be periodically updated or updated upon detection of changing wind parameters.

As mentioned above, the angle of attack may be determined by the controller in a real-time computation based on inputs from the various sensors 121, 125. In alternate embodiments, the angle of attack for various wind parameters may be predetermined (e.g., based on modeling or empirically determined) and stored in an electronic database (i.e., a lookup table) that is accessible by the controller. Thus, the step of determining the angle of attack includes accessing and retrieving a stored value of the angle of attack for the detected wind parameters.

At step 112, the determination is made whether loads that will be induced on components of the wind turbine at the angle of attack and wind parameters are excessive and need to be reduced. The particular components of interest can vary and may include, for example, the blade roots, tower, rotor hub locking device, or any other component that experiences wind-induced loads. This determination may be made, for example, by the controller in a real-time computation based on input from strain/deformation sensors discussed above. In an alternate embodiment, the loads may be predetermined (e.g., via modeling or empirically determined) for various blade orientations and wind parameters and stored in electronic look-up table that provides predefined load values for the blades at various angles of attack. The estimated loads (via sensors or predetermined) are compared to threshold values to determine if the load is excessive and needs to be reduced.

At step 114, in the situation wherein the estimated loads are above a threshold value, the method proceeds to modify the angle of attack to bring the loads to within an acceptable level. This modified angle may not be optimum for eliminating the blade vibrations but will reduce the vibrations while also reducing the loads to an acceptable range.

At step 116, the controller determines a pitch command to bring the blade(s) to an angular position that will most-closely achieve the desired angle of attack orientation for the blade.

Figure 5A:
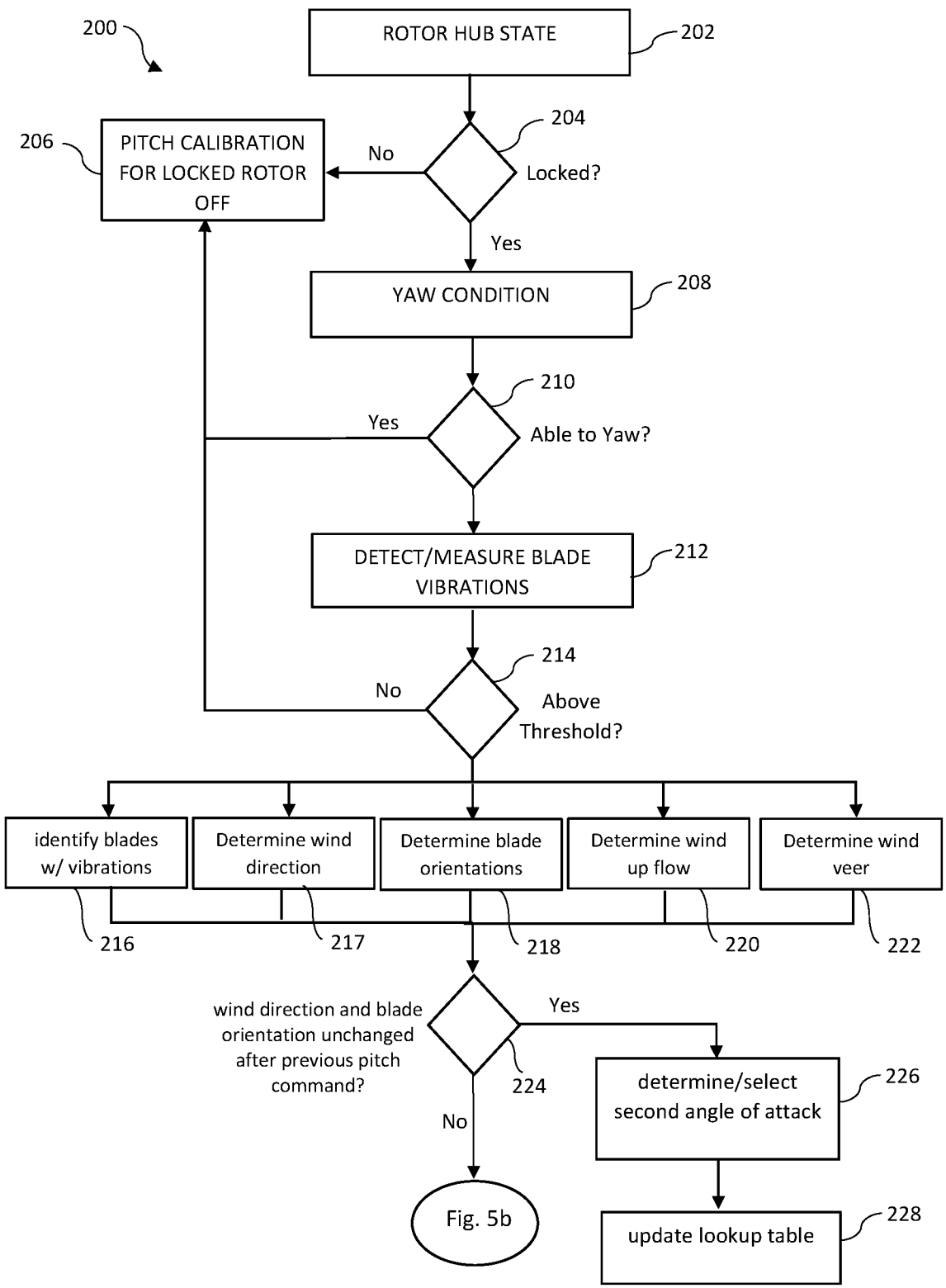
FIGS. 5a and 5b show a more detailed flowchart depicting various method embodiments according to the invention.
Figure 5B:
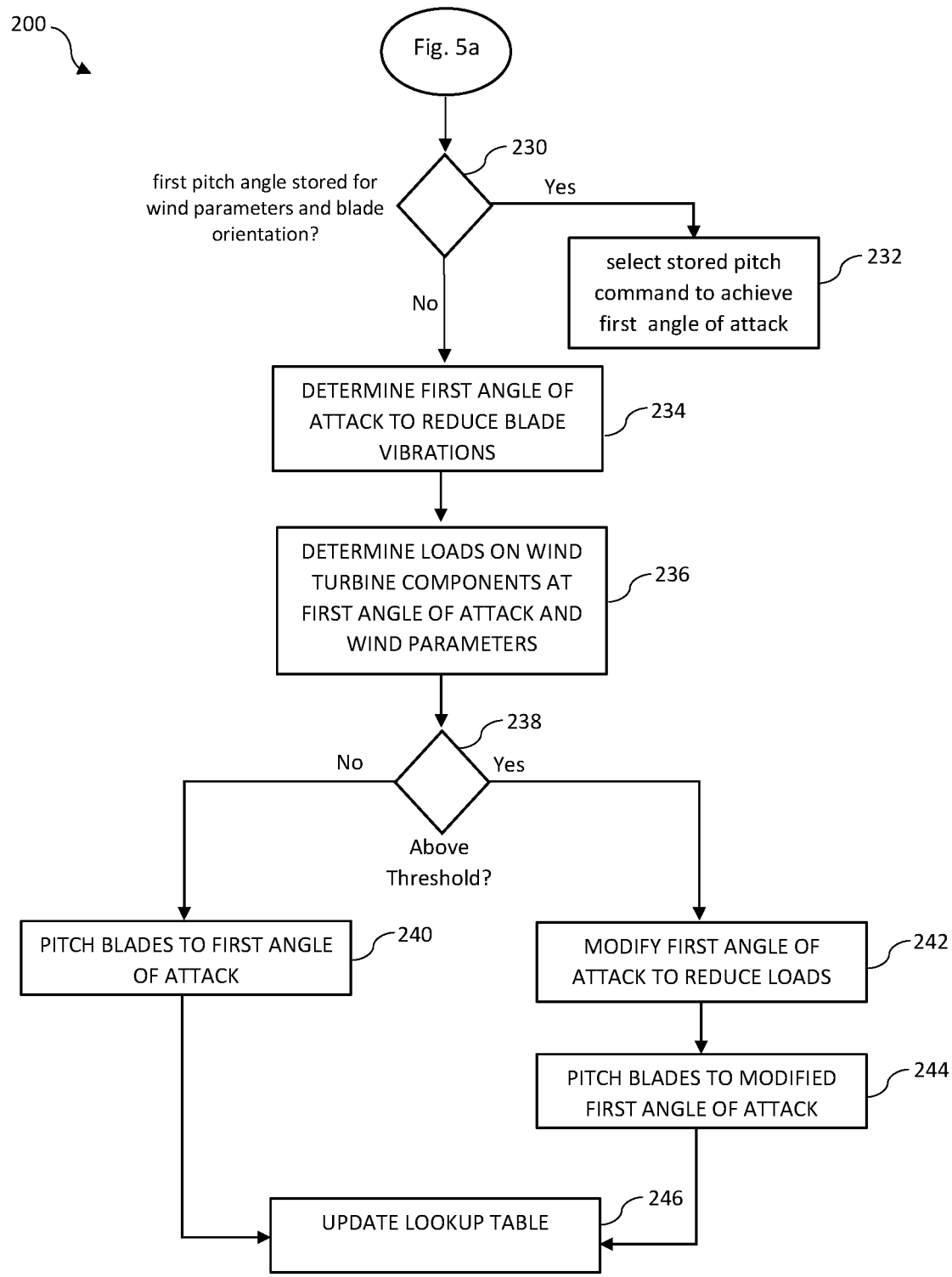

FIGS. 5a and 5b are a block diagram representing various other method embodiments. It should be appreciated that not all of the steps depicted in FIGS. 5a and 5b are necessary for any one embodiment. Various combinations of the steps depicted in FIGS. 5a and 5b are within the scope of the present disclosure.

Referring to FIG. 5a, the method 200 includes step 202 wherein an initial state of the rotor hub is detected by the controller to determine if the rotor hub is locked against rotation.

At step 204, if the rotor hub is not locked, then the process proceeds directly to step 206 wherein the pitch control process is off (not activated). This condition may be present, for example, in a standstill state of the wind turbine wherein the rotor is allowed to idle and rotate.

At step 204, if it is determined by the controller that the rotor hub is locked, then the process proceeds to step 208 wherein the controller determines the yaw state of the rotor. If the rotor is able to yaw, then at step 210 the process diverts to step 206 and the pitch control process is not activated. This step may be desired when it is determined that the ability to yaw to the rotor hub provides sufficient capability to place the blades in a relative position with respect to the wind that prevents the blades from vibrating.

At step 210, if it is determined by the controller that the yaw system is non-operable, then the process proceeds to step 212 wherein the determination is made as to whether one or more of the rotor blades are vibrating. As discussed above, this determination may be made based on input signals from the strain/deformation gauges on the blades to the controller. Alternatively, vibrations may be assumed based on wind parameters that are known to induce vibrations in the blades of a locked rotor hub.

At step 214, the determination is made as to whether the vibrations exceed a threshold value that requires further action by the pitch control system to reduce the vibrations. If the vibrations do not exceed the threshold value, then corrective action is not needed and the pitch control process is not activated.

If the vibration threshold value is exceed at step 214, then the process proceeds to multiple steps 216-222. These steps may be performed concurrently or sequentially.

At step 216, the blades that are actually vibrating are identified, for example via the input signals from the strain/deformation sensors located on the blades.

At step 217, one or more wind parameters are determined, which may include one or both of wind direction and wind speed.

At step 218, the initial orientation of the vibrating blades is determined, as discussed above.

At steps 220 and 222, additional wind parameters may be detected or measured, such as wind veer and up-flow, as needed for determination of the corrective angle of attack for the vibrating blades.

At step 224, the determination is made as to whether or not the vibrating blades have been previously corrected according to the present process. If so, and the wind direction (or other wind parameters) and blade orientation is the same as for the previous correction, then it is assumed that the angle of attack computed/determined from the previous correction is inadequate. In this case, the process proceeds to step 226 wherein a second angle of attack for the given wind parameters is determined and applied. This second angle of attack may be computed in real-time by the controller or may be retrieved from an electronic lookup table that stores one or more second (additional) angles of attack computed or derived for blades having a similar initial angle of attack and experiencing similar wind conditions. As discussed above, these additional angles of attack may be determined empirically or via modelling.

At step 228, the lookup table is updated such that the selected second angle of attack that successfully reduces or eliminates the blade vibrations becomes the primary or first angle of attack in the lookup table for the given wind parameters. This embodiment is useful when the determination of the corrective first angle of attack is not computed in real-time by the controller, but is selected from the lookup table based on the current wind parameters and initial angle of attack of the vibrating blades.

At step 224, if the wind direction and initial blade angle of attack are different from a previous correction, then the process proceeds to step 230 in FIG. 5b. In this step, the determination is made as to whether a corrective pitch angle command is stored (e.g., in the lookup table) for the current wind parameters and initial angle of attack of the vibrating blades to achieve the desired first angle of attack to reduce or eliminate vibrations in the blade. If so, the stored pitch angle is retrieved at step 232 and a command is issued by the controller to the pitch control system based on the stored pitch angle.

If a stored pitch angle command is not available for the given wind parameters and initial angle of attack of the blades, then at step 234 the determination is made of a corrective first angle of attack and the pitch command that will achieve this angle of attack for the vibrating blades.

At step 236, the process proceeds to consider the expected loads that one or more wind turbine components will experience when the blades are pitched to the first angle of attack. These loads may be computed in real-time or may be predetermined and stored based on empirical determination or modelling.

If the expected loads are below a threshold value at step 238, then a modification to the first angle of attack is not necessary and the blades are pitched to achieve the first angle of attack at step 240. The lookup table is then updated at step 246 with the data related to the first angle of attack at the given wind conditions.

If the expected loads are above the threshold value at step 238, then the process proceeds to step 242 wherein a modification is made to the first angle of attack to reduce the loads to below the threshold value. This modification may result in less of a reduction of the blade vibrations but is necessary to prevent damage to the wind turbine components from excessing loads.

At step 244, the controller issues a command to the pitch control system to pitch the vibrating blades to a pitch angle that will achieve the modified first angle of attack.

At step 246, the lookup table is updated with the data relevant to the modified first angle of attack at the given wind conditions.

Further aspects of the invention are provided by the subject matter of the following clauses:

Clause 1: A method for reducing vibrations and loads in one or more rotor blades on a rotor hub of a wind turbine when the wind turbine is in a standstill condition with the rotor hub locked against rotation, the method comprising: detecting that one or more of the rotor blades are vibrating above a threshold limit; determining one or more wind parameters for wind impacting the rotor blades; determining an initial blade orientation of the rotor blades to an incoming wind direction; based on the wind parameters and initial blade orientations, determining a first angle of attack for the rotor blades that will reduce the vibrations in the rotor blades; determining if expected loads induced at one or more wind turbine components will exceed a threshold limit at the first angle of attack for the rotor blades; modifying the first angle of attack when the expected loads exceed the threshold limit to reduce the expected loads to below the threshold limit; and with a controller, pitching the rotor blades to the first angle of attack using an auxiliary drive system in the wind turbine.

Clause 2: The method according to the preceding clause, further comprising determining that yaw control is unavailable for the locked rotor hub as a prerequisite to pitching the rotor blades to the first angle of attack.

Clause 3: The method according to any preceding clause, wherein the wind parameters comprise one or a combination of wind direction, wind speed, wind up-flow, and wind veer.

Clause 4: The method according to any preceding clause, further comprising storing the first angle of attack for the determined wind parameters red in a lookup table accessible by the controller for subsequent use by the controller.

Clause 5: The method according to any preceding clause, further comprising: determining an initial angle of attack of the rotor blades that are vibrating; comparing the first angle of attack to the initial angle of attack; and when the initial angle of attack and the first angle of attack are equal within a defined range at the same wind parameters, determining a second angle of attack to reduce the vibrations and maintain the expected loads to below the threshold limit.

Clause 6: The method according to any preceding clause, wherein one or more of the second angle of attack are predetermined for the different wind parameters and stored in the lookup table and selected by the controller.

Clause 7: The method according to any preceding clause, further comprising updating the lookup table such that the selected second angle of attack becomes the first angle of attack in the lookup table at the determined wind parameters for subsequent use by the controller.

Clause 8: The method according to any preceding clause, further comprising determining and storing in the lookup table at least one additional second angle of attack for the determined wind parameters for subsequent use by the controller.

Clause 9: A method for reducing vibrations and loads in one or more rotor blades on a rotor hub of a wind turbine when the wind turbine is in a standstill condition with the rotor hub locked against rotation, the method comprising: detecting that one or more of the rotor blades are vibrating above a threshold limit; determining one or more wind parameters for wind impacting the rotor blades; determining an initial blade orientation of the rotor blades to an incoming wind direction; based on the wind parameters and initial blade orientation, determining a first angle of attack for the rotor blades; wherein the first angle of attack is predetermined to reduce the vibrations on the rotor blades and maintain expected loads induced at one or more wind turbine components below a threshold limit; and with a controller, pitching the rotor blades to the first angle of attack using an auxiliary drive system in the wind turbine.

Clause 10: The method according to preceding clause, further comprising determining that yaw control is unavailable for the locked rotor hub as a prerequisite to detecting that one or more of the rotor blades are vibrating.

Clause 11: The method according to any preceding clause, wherein the first angle of attack for different wind parameters are predetermined and stored in a lookup table accessible by the controller.

Clause 12: The method according to any preceding clause, further comprising: determining an initial angle of attack of the rotor blades that are vibrating; comparing the initial angle of attack to the first angle of attack; and when the initial angle of attack and the adjusted angle of attack are equal within a defined range at the same wind parameters, determining a second angle of attack for the vibrating rotor blades to reduce the vibrations and maintain the expected loads below the threshold limit.

Clause 13: The method according to any preceding clause, wherein a plurality of the second angles of attack are predetermined for the different wind parameters and stored in the lookup table and selected by the controller.

Clause 14: The method according to any preceding clause, further comprising updating the lookup table such that the second angle of attack becomes the first angle of attack at the determined wind parameters for subsequent use by the controller.

Clause 15: A wind turbine, comprising: rotor blades on a rotatable rotor hub; one or more sensors located to detect wind parameters of wind impacting the rotor blades; a pitch system configured to change a pitch angle of the rotor blades; a controller in operable communication with the pitch system; wherein with the rotor hub locked against rotation, the controller is configured to: detect that one or more of the rotor blades are vibrating above a threshold limit; determine one or more wind parameters for wind impacting the rotor blades; determine an initial blade orientation of the rotor blades to an incoming wind direction; based on the wind parameters and blade orientation, determine a first angle of attack for the rotor blades that will reduce the vibrations in the rotor blades and maintain expected loads induced at one or more wind turbine components at the first angle of attack below a threshold limit; and pitch the rotor blades to the first angle of attack using the pitch system.

Clause 16: The wind turbine according to the preceding clause, wherein the controller is further configured to: determine an initial angle of attack of the rotor blades that are vibrating; compare the first angle of attack to the initial angle of attack; and when the initial angle of attack and the first angle of attack are equal within a defined range at the same wind parameters, determine a second angle of attack to reduce the vibrations and maintain the expected loads below the threshold limit.

Clause 17: The wind turbine according to any preceding clause, further comprising an electronic lookup table accessible by the controller, wherein the first angle of attack and one or more of the second angle of attack are predetermined for the different wind parameters, stored in the lookup table, and selectable by the controller.

Clause 18: The wind turbine according to any preceding clause, wherein the controller is further configured to update the lookup table such that the first angle of attack is replaced by the second angle selected by the controller and thus of attack becomes the first angle of attack at the determined wind parameters for subsequent use by the controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing vibrations and loads in one or more rotor blades on a rotor hub of a wind turbine when the wind turbine is in a standstill condition with the rotor hub locked against rotation and the rotor blades are at an initial angle of attack to an incoming wind direction, the method comprising:
   detecting that one or more of the rotor blades are vibrating above a threshold limit;
   determining one or more wind parameters for wind impacting the rotor blades;
   based on the wind parameters and the initial angle of attack, determining or retrieving a first angle of attack for the rotor blades different from the initial angle of attack that will reduce the vibrations in the rotor blades;
   identifying expected loads at one or more wind turbine components that vary with changing wind parameters and varying angle of attacks of the rotor blades;
   determining if the expected loads induced at one or more of the wind turbine components will exceed a threshold limit at the first angle of attack for the rotor blades;
   with a controller, pitching the rotor blades to the first angle of attack when the expected loads do not exceed the threshold limit using an auxiliary drive system in the wind turbine;
   modifying the first angle of attack to a modified angle of attack when the expected loads exceed the threshold limit to reduce the expected loads to below the threshold limit, wherein the modified angle of attack results in an increase in the vibrations in the rotor blades as compared to the first angle of attack; and
   with the controller, pitching the rotor blades to the modified angle of attack using the auxiliary drive system.

2. The method according to claim 1, wherein the wind turbine has a yaw control system, the method further comprising determining that yaw control is unavailable for the locked rotor hub as a prerequisite to pitching the rotor blades to the first or the modified angle of attack.

3. The method according to claim 1, wherein the wind parameters comprise one or a combination of wind direction, wind speed, wind up-flow, and wind veer.

4. The method according to claim 1, wherein the first angle of attack for the determined wind parameters is stored in and retrieved from a lookup table accessible by the controller, the method further comprising updating the stored first angle of attack in the lookup table to equal the modified angle of attack for subsequent retrieval and use by the controller.

5. The method according to claim 4, further comprising:
   prior to determining the expected loads, comparing the first angle of attack to the initial angle of attack; and
   when the initial angle of attack and the first angle of attack are equal within a defined range at the same wind parameters, changing a value of the first angle of attack to equal a different second angle of attack prior to determining the expected loads at the changed first angle of attack.

6. The method according to claim 5, wherein one or more of the second angle of attack are predetermined for the different wind parameters and stored in the lookup table and selected by the controller.

7. The method according to claim 6, further comprising updating the first angle of attack in the lookup table to the changed first angle of attack for subsequent retrieval and use by the controller.

8. A wind turbine, comprising:
rotor blades on a rotatable rotor hub;
one or more sensors located to detect wind parameters of wind impacting the rotor blades;
a pitch system configured to change a pitch angle of the rotor blades;
a controller in operable communication with the pitch system;
wherein with the rotor hub locked against rotation and the rotor blades at an initial angle of attack, the controller is configured to:
  detect that one or more of the rotor blades are vibrating above a threshold limit;
  determine one or more wind parameters for wind impacting the rotor blades;
  based on the wind parameters and the initial angle of attack, determine or retrieve a first angle of attack for the rotor blades different from the initial angle of attack that will reduce the vibrations in the rotor blades;
  determine if expected loads induced at one or more wind turbine components will exceed a threshold limit at the first angle of attack for the rotor blades, the expected loads varying with changing wind parameters and different angles of attack of the rotor blades;
  pitch the rotor blades to the first angle of attack when the expected loads do not exceed the threshold limit using the pitch system;
  modify the first angle of attack when the expected loads exceed the threshold limit to reduce the expected loads to below the threshold limit, wherein the modified angle of attack results in an increase in the vibrations in the rotor blades as compared to the first angle of attack.

9. The wind turbine according to claim 8, wherein the controller is further configured to:
prior to determining the expected loads, compare the first angle of attack to the initial angle of attack; and
when the initial angle of attack and the first angle of attack are equal within a defined range at the same wind parameters, change a value of the first angle of attack to equal a second different angle of attack prior to determining whether the expected loads at the changed first angle of attack are below the threshold limit.

10. The wind turbine according to claim 9, further comprising an electronic lookup table accessible by the controller, wherein the first angle of attack and one or more of the second angle of attack are predetermined for the different wind parameters, stored in the lookup table, and selectable by the controller.

11. The wind turbine according to claim 10, wherein the controller is further configured to update the lookup table such that the first angle of attack equals the changed first angle of attack for subsequent retrieval and use by the controller.

* * * * *